(12) United States Patent
Samworth

(10) Patent No.: US 7,700,910 B2
(45) Date of Patent: Apr. 20, 2010

(54) METHOD OF COMPENSATING A DENSITY LOG

(75) Inventor: James Roger Samworth, Ashby de la Zouch (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 0 days.

(21) Appl. No.: 11/138,616

(22) Filed: May 26, 2005

(65) Prior Publication Data

US 2005/0263692 A1 Dec. 1, 2005

(30) Foreign Application Priority Data

May 28, 2004 (GB) ................... 0411965.7

(51) Int. Cl.
*G01V 5/12* (2006.01)
(52) U.S. Cl. ............ 250/269.1; 250/266; 702/8
(58) Field of Classification Search ............ 250/269.1, 250/266; 702/8
See application file for complete search history.

(56) References Cited

U.S. PATENT DOCUMENTS

| | | | |
|---|---|---|---|
| 3,654,470 A | | 4/1972 | Wilson |
| 4,350,887 A * | | 9/1982 | Barnard et al. ............ 250/265 |
| 4,700,300 A * | | 10/1987 | Schultz et al. ............ 702/8 |
| 5,390,115 A * | | 2/1995 | Case et al. ............ 702/8 |
| 5,525,797 A * | | 6/1996 | Moake ............ 250/269.3 |
| 5,530,243 A * | | 6/1996 | Mathis ............ 250/269.3 |
| 5,619,411 A * | | 4/1997 | Smith ............ 702/8 |
| 5,627,368 A * | | 5/1997 | Moake ............ 250/269.3 |
| 5,659,169 A * | | 8/1997 | Mickael et al. ............ 250/269.3 |
| 5,767,510 A * | | 6/1998 | Evans ............ 250/269.1 |
| 2003/0216866 A1 * | | 11/2003 | Calvert et al. ............ 702/8 |
| 2004/0210393 A1 * | | 10/2004 | Ellis et al. ............ 702/8 |

OTHER PUBLICATIONS

Mirison, Sam, Patent Act 1977: Search Report under Section 17, Oct. 12, 2004, 1 page, The Patent Office, UK.
J. R. Samworth, "The Dual-Spaced Density Log—Characteristics, Calibration, and Compensation" The Log Analyst, Jan.-Feb. 1992, pp. 42-49, UK.

* cited by examiner

*Primary Examiner*—David P Porta
*Assistant Examiner*—Shun Lee
(74) *Attorney, Agent, or Firm*—Mark A. Oathout

(57) ABSTRACT

A method of compensating a density log comprises the step of compensating the far density by adding a correction at a given point in the density log wherein: (a) the correction comprises at least a first correction function and optionally a second correction function; (b) when the correction includes both the first and second correction functions they respectively are corrections for "slow-moving" and "fast-moving" perturbations at the said given point; and (c) regardless of whether the correction includes the second correction function the first correction is filtered by a long filter.

12 Claims, 7 Drawing Sheets

METHOD OF COMPENSATING A DENSITY LOG

CROSS-REFERENCE TO RELATED APPLICATIONS

This application claims the foreign priority benefits of UK patent application number 0411965.7 filed May 28, 2004.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to a method of compensating a density log.

It is well known to log boreholes using a density logging technique.

In this technique a tool containing a source of gamma radiation is inserted into a borehole. The radiation penetrates the surrounding formation, where it collides with atomic electrons in the formation. According to the well-known Compton effect this results in the backscattering of a certain amount of gamma radiation, some of which returns to the tool.

The tool contains a pair of radiation detectors (i.e. scintillation crystals). One of these is commonly termed the "near detector" and lies closer to the gamma source than the other. The latter is termed the "far detector".

The near detector provides data on the density of a region in the vicinity of the borehole wall. The far detector provides such data with regard to locations spaced from the borehole wall.

It is known that mudcake formed on the interior of the borehole wall, and drilling mud (or other fluid) in the borehole column, cause inaccuracies in the far detector measurements. In the absence of the near detector values therefore it would be impossible to obtain accurate density measurements. However the use of both the near and far detectors allows the use of the signals from the former to compensate the data from the latter for the effects of mudcake and column mud/other fluid.

The paper "The Dual-Spaced Density Log—Characteristics, Calibration, and Compensation" (The Log Analyst, January-February 1992, pp. 42-49) sets out inter alia a method of using dual (ie. near and far) detectors to compensate backscattered gamma density readings for the effects of mudcake and column mud or other fluid in the annular space between a logging tool and a borehole wall caused by the stand off of the tool.

The attention of the reader is directed to the aforementioned paper, the entire disclosure of which is incorporated herein by reference.

In essence the technique disclosed in "The Dual Spaced Density Log—Characteristics, Calibration, and Compensation" involves defining a geometric factor G, which describes the depth of measurement penetration of each of the detectors in the logging tool.

G is defined as $$G = 1 - e^{-kr}$$

in which k is a constant; and r the radial distance from the tool.

According to the geometric-factor theory on which the compensation in the "The Dual Spaced Density Log—Characteristics, Calibration, and Compensation" is based, the geometric factor $G_m$ attributable to the mudcake, and the geometric factor $G_f$ attributable to the formation fluid, sum to unity. Substituting various known expressions for the terms in G allows the derivation of a compensated formation density expression.

Although the technique of "The Dual Spaced Density Log—Characteristics, Calibration, and Compensation" has proved highly successful, it relies on a number of assumptions which are not applicable to every well under investigation.

Firstly, the method assumes that the tool is stood-off parallel to the formation, by reason of the mudcake being of constant cross-section and parallel sided.

In caved-in or rugose wells this is unlikely to be the case.

Some other wells suffer from drilling-induced cyclic "spiralling" the nature of which will be known to those of skill in the art. Such spiralling also renders inapplicable the "parallel standoff" assumption in "Dual Spaced Density Log—Characteristics, Calibration, and Compensation".

Additionally, the statistical noise on any radiation counting system is related to the square root of the counting rate. Most of this noise arises from the long-spaced detector in a dual-spaced detector system because this detector has a relatively low counter rate due to its distance from the radioactive source.

The compensation technique of "The Dual Spaced Density Log—Characteristics, Calibration, and Compensation" is successful if the interfering effect is synchronous, or common, to the two detectors, as arises from mudcake. If the interfering effect however is not synchronous (such as derives from counting statistics) it does not cancel, and simply appears as (undesirable) noise in the processed (final) log.

This undesirable noise is further exacerbated by the known compensation process that combines the measurements of the near and far density detectors together, typically, but not exclusively, in a linear way. However this is done, the result is to multiply the measurement from the far detector by a number greater than unity. Typically, this combination can be represented by the equation:

Compensated density = $A$*Far density + $(1-A)$*Near density

Where A is a constant that is greater than 1

BRIEF SUMMARY OF THE INVENTION

As explained previously, the far density, because of its longer spacing, suffers from a low count rate that causes it to dominate the statistical error, and since the number A is greater than unity the error is multiplied by that factor. A method of implementing the above equation without the concomitant error multiplication is therefore very desirable. One method would be average more data when forming the above equation, but this has the undesirable effect of degrading the ability of the instrument to successfully resolve thin geological structures, as the data is acquired as the logging tool is moving through the borehole.

FIG. 1 graphically summarises some of the problems arising from assumptions about the nature of a well under investigation.

FIG. 1 shows a density logging device 10 in which a source 11 of gamma radiation and near, 12, and far, 13, detectors in the form of scintillation crystals are contained within an elongate, cylindrical metal body 14. Body 14 includes per se known windows permitting emission of Gamma radiation from the source 11 and detection at the detectors 12, 13 of the backscattered radiation.

The cylindrical body 14 is lowered eg. on wireline or by reason of being pumped or otherwise deployed, so as to protrude from the free end of a length of drillpipe, into a borehole formed in a geological formation 16.

The wall of the borehole is represented by numeral 17. As shown, it is not unusual for the wall 17 to be irregular in numerous respects.

A layer of mudcake 18 lining the borehole wall 17 consequently exhibits numerous contours. Moreover the mudcake layer may be of non-constant cross section as shown.

As a consequence of the parallel sided nature of the cylindrical body 14 the degrees of standoff respectively of the near and far detector crystals 12, 13 are not the same.

It follows from this that there is a need for increased accuracy of density log compensation in boreholes exhibiting one or more of the following characteristics:

Caved-in, deviated, squeezed or washed-out sections;
Rugosity;
Varying thickness and/or cross-section of mudcake; and/or
Cyclic spiralling.

Broadly stated, a compensated density log is a log that is formed by combining the near and far logs to reduce the effect(s) of perturbation(s). Regardless of how it is formed, a compensated density equation can be alternatively expressed by:

Compensated Density=Far Density+Correction

When expressed in this way, the Correction is some function of the near and far logs and contains little geological information. Furthermore, the amount of correction needed for optimal performance is different for different perturbations.

As noted, one technical problem lies in achieving a good level of correction both for perturbations (referred to herein as "slow-moving" perturbations) including but not limited to tool standoff caused by mud-cake; and for perturbations (referred to herein as "fast-moving" perturbations) including but not limited to borehole irregularities.

According to a first aspect of the invention therefore there is provided a method of compensating a density log comprising the step of compensating the far density by adding a correction at a given point in the density log wherein:

(a) the correction comprises at least a first correction function and optionally a second correction function;
(b) when the correction includes both the first and second correction functions they respectively are corrections for "slow-moving" and "fast-moving" perturbations at the said given point; and
(c) regardless of whether the correction includes the second correction function the first correction is filtered by a long filter.

By way of explanation, therefore, the method of the invention is embodied in the steps needed to give effect to the equation:

Compensated Density=Far Density+Correction(1)+Correction(2)

In this equation, Correction(1) is associated with the mud-cake which has only a slow variation along the well-bore relative to the source-detector separation, and Correction(2) (when needed) is associated with the well irregularity (when present) that has a spatial variation comparable to the source-detector separation. Correction(1) contains relatively static information relating to the shift required to correct the log for the average tool standoff. Correction(2) contains the higher frequency information relating to the well irregularity, but no standoff information and therefore averages to zero.

For the avoidance of doubt, the worker of ordinary skill in the relevant art will readily understand the terms "slow-moving" and "fast-moving" as used herein. He will additionally know that the slow-moving perturbations derive typically from the effects of mud-cake; and that the fast-moving perturbations derive typically from the effects of well irregularities of various kinds.

Further for avoidance of doubt the worker of ordinary skill will understand the term "long filter" to refer to a filter whose length is at least double, and preferably several integer multiples of the near detector spacing. Thus in the context of the invention as defined herein the term "long filter" is intended to exclude the per se known (typically ½ m long) filters used in the prior art for smoothing the near detector output.

In order to derive a method to implement the invention as defined hereinabove, the method employs the concept of a "penetration ratio" shown in FIG. 3. Thus preferably the first correction function at a given point in the density log is related to the difference between (in practice, significantly filtered or smoothed) far and near density values multiplied by a first function of penetration ratio; and the second correction function at a given point in the log is related to the difference between the far density difference from the (in practice smoothed) far density and the near density difference from the (in practice smoothed) near density, as defined herein, multiplied by a second function of penetration ratio.

As described in more detail below, the method of the invention robustly copes with the aforementioned sources of error.

Preferably the first correction function is defined by the expression:

$$(k-1)*(\text{far density}-\text{near density}),$$

in which k is the said first value of penetration ratio.

It is further preferable that the method includes the step of smoothing the far density and the near density for use in this equation using a long filter. This is tenable because the difference between the two densities contains little geological information.

Conveniently the second correction function is defined by the expression:

$$(k'-1)*(\text{far density difference}-\text{near density difference}),$$

in which k' is the said second value of penetration ratio; "far density difference" at a given point in the density log is the difference between the far density filtered by a long filter, and the logged far density; and "near density difference" at a given point in the density log is the difference between the near density filtered by a long filter, and the logged near density.

Conveniently the method includes the step of filtering the logged near density to match its vertical resolution to the far density.

A further step of the method of the invention includes depth-aligning the logged near and far densities.

A derivative of the method of the invention (in which the second correction function is forced to zero) is effective to reduce the random or statistical fluctuation evident in a compensated density log whenever the effective standoff from the formation is large, a situation that demands a large correction. This effect arises in a cased well, and also in some other well situations. Therefore the method of the invention additionally advantageously opens up the possibility of improving a dual-spaced density log on a finished, cased well or on a well in which the density tool standoff is for other reasons larger than normal. This improvement has not been possible in a successful manner hitherto.

Thus the invention also resides in a method as defined herein and including the aforesaid second correction forced to zero, the method optionally being carried out in respect of a cased-hole log.

Conveniently this method optionally includes the step of compensating the cased-hole log for the presence of casing collars.

Any of the aforementioned method steps may in accordance with the invention be carried out using a programmable computer.

The invention also extends to a programmable computer that is programmed to carry out a method according to the invention as defined herein.

Furthermore the invention embraces within its scope data obtained by a method according to the invention as defined herein.

BRIEF DESCRIPTION OF THE SEVERAL VIEWS OF THE DRAWINGS

There now follows a description of preferred embodiments of the invention, by way of non-limiting example, with reference being made to the accompanying drawings in which.

DETAILED DESCRIPTION OF THE PREFERRED EMBODIMENT(S)

In the following description the apparatus used essentially is that shown schematically in FIG. 1.

Figure 1:
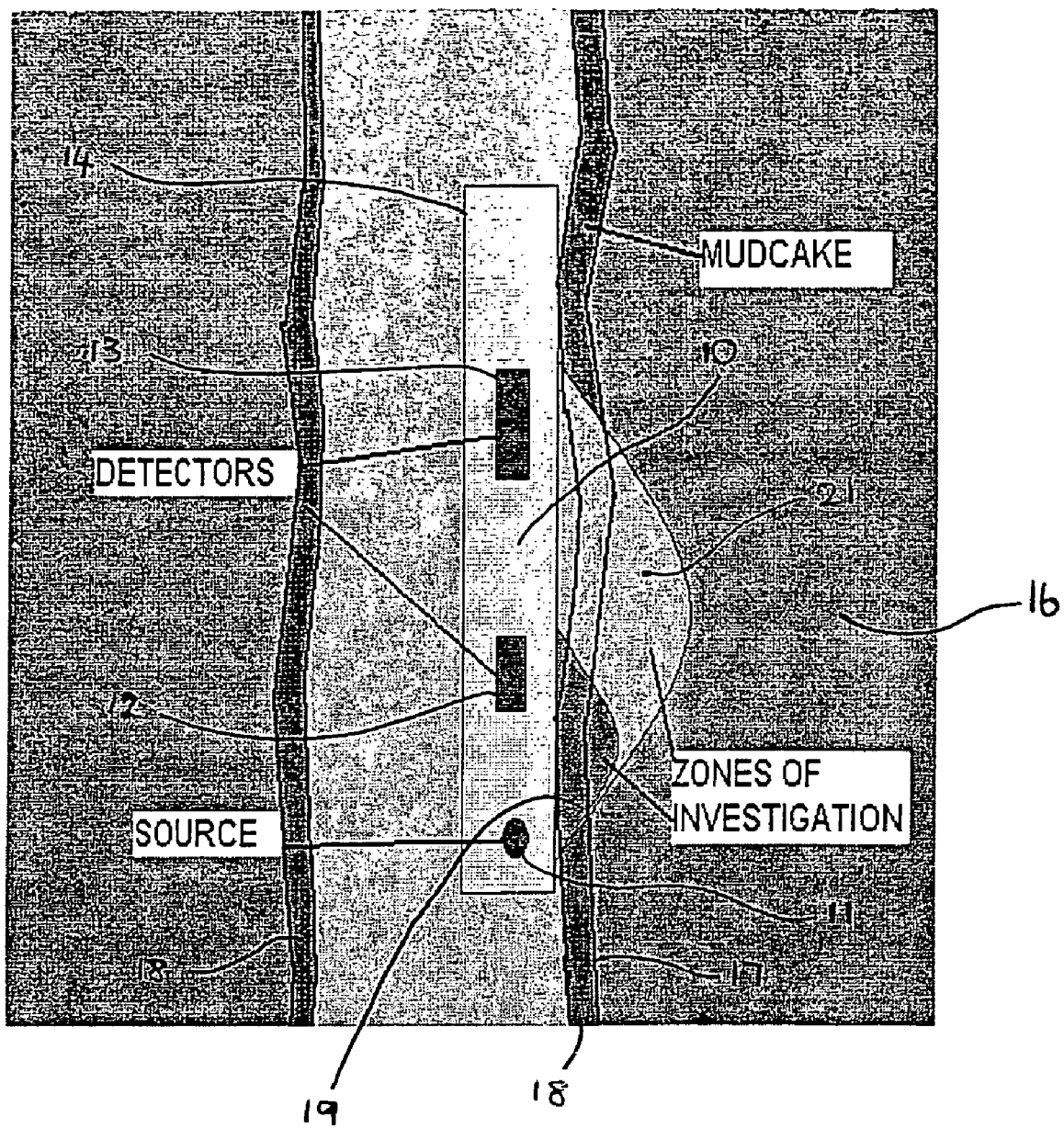
FIG. 1 is a schematic representation of a dual-spaced density log in a borehole having non-uniform characteristics.

In addition to the features of FIG. 1 already described, the drawing also shows two zones of investigation (19, 21) that are, respectively, the parts of the formation investigated by the near and far scintillation crystals 12, 13.

As is immediately evident from the representations of the investigation zones 19, 21, the near detector 12 includes a very considerably greater effect deriving from the mudcake and borehole fluid, than the zone investigated by the far detector 13. It follows from this that the near detector density measurements are highly suitable for compensating the (noise-sensitive) far detector measurements for the effects of mudcake (and, if present, a well casing or other cause of large standoff).

Figure 2:
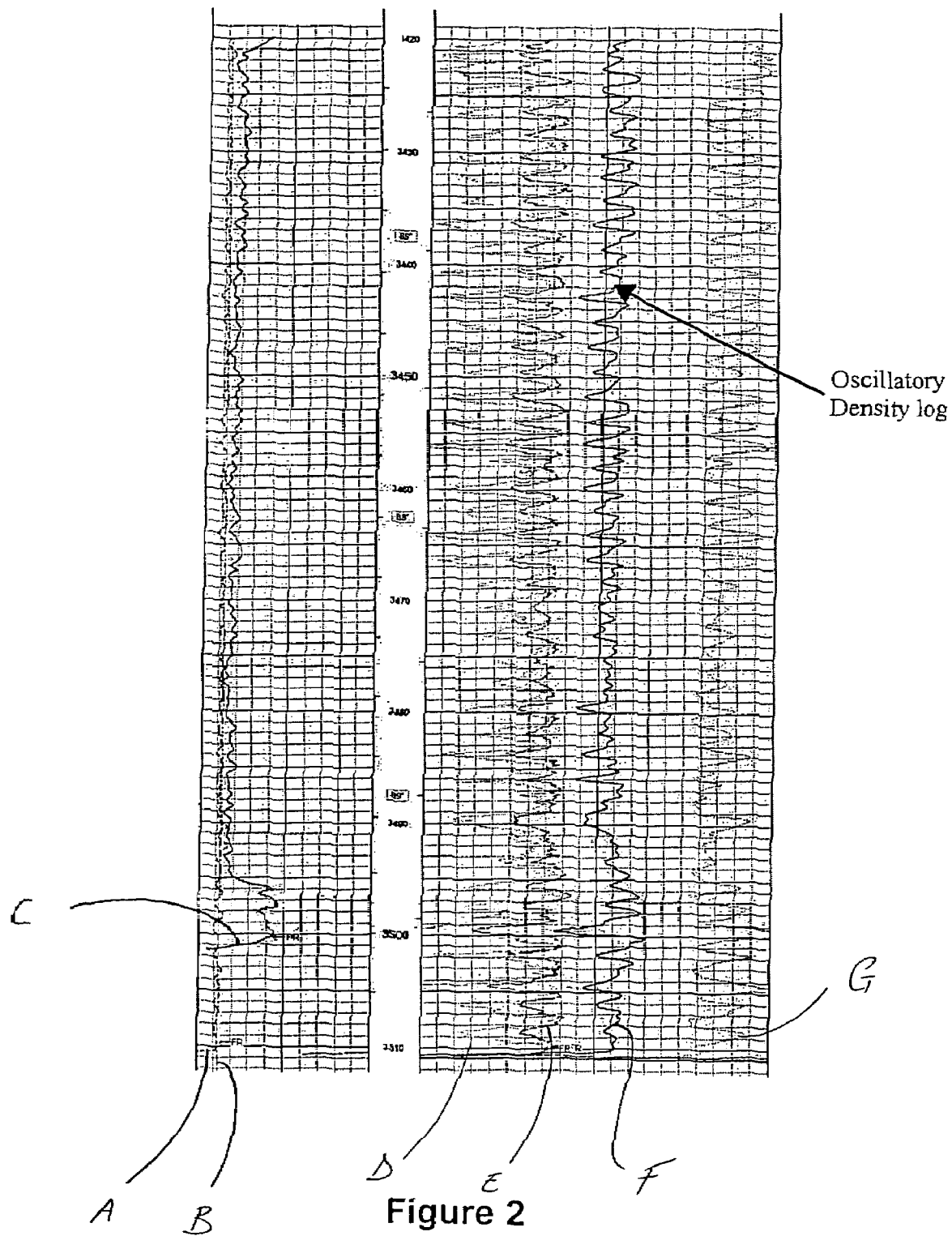
FIG. 2 is a typical, uncompensated density log in a so-called "spiral" borehole.
Figure 4:
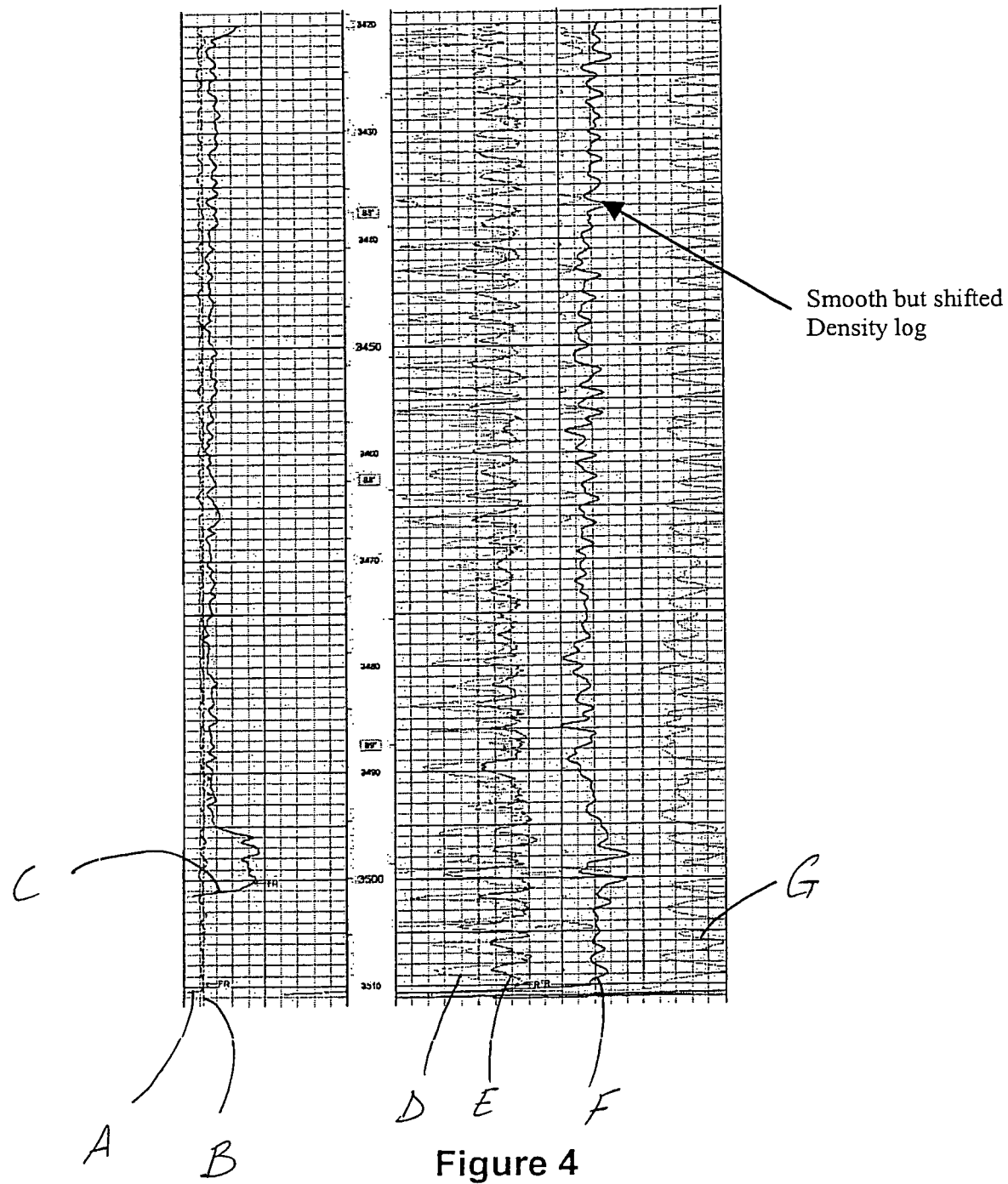
FIG. 4 shows the log of FIG. 2 following compensation according to the method defined in "The Dual Spaced Density Log—Characteristics, Calibration, and Compensation"
Figure 5:
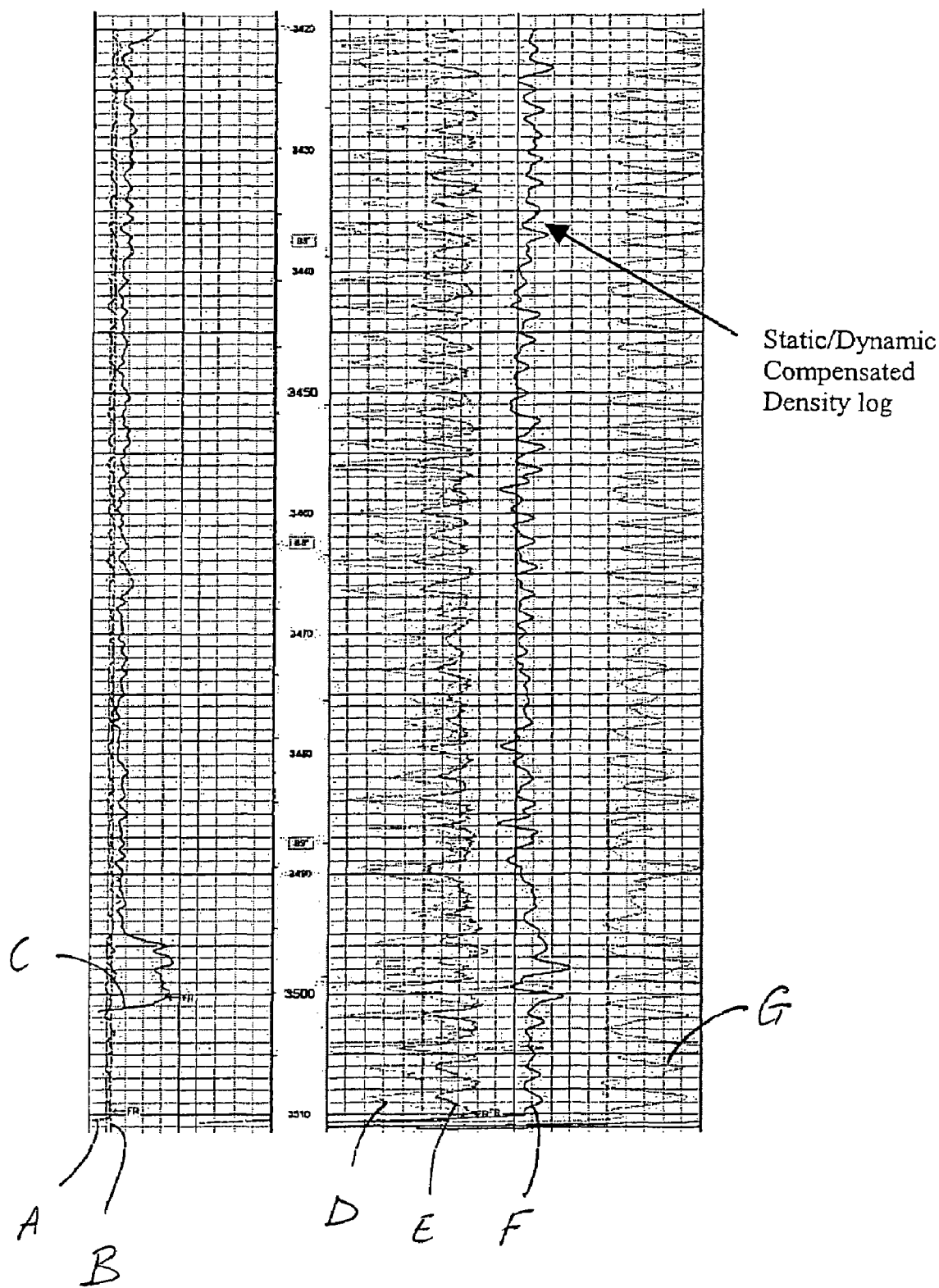
FIG. 5 shows the same log following correction according to the broad aspect of the invention defined herein.

In the logs of FIGS. 2, 4 and 5:

Track 1 contains:
  Caliper 125-375 mm labelled by reference sign 'A' in the Figure;
  Bit size 125-375 mm labelled by reference sign 'B' in the Figure; and
  Gamma-ray 0-150 API labelled by reference sign 'C' in the Figure.

Track 2 contains:
  Near density (short dashes) 1.75-3.75 gm/cc labelled by reference sign 'D' in the Figure;
  Far density (long dashes) 1.75-3.75 gm/cc labelled by reference 'E' in the Figure; and
  Compensated density (solid) 2-3 gm/cc labelled by reference sign 'F' in the Figure.

Track 3 contains:
  Density compensation (dots)-0.25-250 gm/cc labelled by reference sign 'G' in the Figure.

As noted, the basic theory of density compensation using dual-spaced detectors is given in "The Dual Spaced Density Log—Characteristics, Calibration, and Compensation".

Before combination, in order to avoid anomalous log excursions at bed boundaries, the Near and Far logs must be depth-aligned and the Near density filtered to match its vertical resolution to the Far density. The depth alignment can be particularly critical in rugose holes. After this has been done:

$$\text{Compensated Density} = \text{Far Density} + \text{Correction}$$

The Compensated density, in open-hole, can be derived to a good approximation by linearly combining the Far and Near Densities as:

$$\text{Compensated Density} = k^* \text{Far Density} + (1-k)^* \text{Near Density}$$

Figure 3:
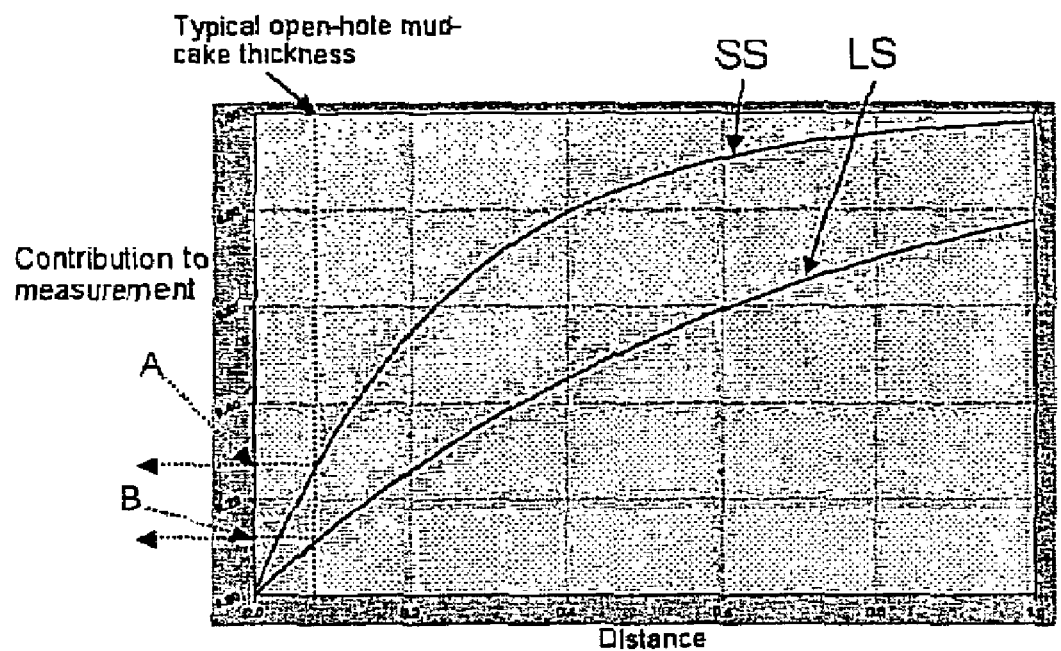
FIG. 3 is a plot showing the contribution of each density measurement against its radial penetration into the formation.

This equation is derived from a consideration of the penetration of the measurements into the formation, as represented in FIG. 3

The value of the penetration ratio, A/B is related to the "k" value in the compensation equation as:

$$k = (A/B)/((A/B)-1)$$

For example, if A/B=3 (typical for open-hole) then k=1.5.

The value of "k" used in the example is, in fact, a value of 1.6. To reduce the oscillation further a higher value of "k" is necessary. FIG. 4 shows this, a value of 1.9 being employed.

The oscillation on the log is now much reduced, but the value of k=1.9 has shifted the log to an erroneous level. A different value of "k" is thus required to optimally compensate for a "static" mud-cake to that required to best compensate for short-period cyclic well effects.

In the first instance, the compensation equation may be re-considered in the form:

$$\text{Compensated Density} = \text{Far Density} + \text{Correction}$$

where:

$$\text{Correction} = (k-1)^* (\text{Far Density} - \text{Near Density})$$

The "Correction" so derived does not have any primary geological component, and can therefore be calculated from Near and Far densities smoothed with a long filter without losing geological information. This essentially gives an average, or "static" correction, with which the "standard" value of "k" can be used being typically in the range 1.25 to 1.75

Correction(1)=($k$−1)*(Long filtered Far Density−Long filtered Near Density)

In accordance with the method of the invention, in the second instance a further correction can be made to correct for fast-moving errors. Subtracting the original Far density from the long filtered version, and subtracting the resolution-matched Near density from its long filtered version, gives near and far difference logs whose average is zero. The next step in the method of the invention therefore is to create a second "correction" based on these difference logs, and employing a different value of "k".

Correction(2)=($k'$−1)*(Far Density difference−Near Density difference)

The compensated density is then calculated as:

Compensated Density=Far Density+Correction(1)+Correction(2)

This potentially gives the benefit of separately correcting for slow-moving mud-cake and fast-moving rugosity. The previous log (of FIGS. 2 and 4) therefore processed with k=1.6 and k'=1.9 produces the inventive, compensated log shown in FIG. 5. The log is now much smoother than the FIG. 2 log, without the erroneous shift of FIG. 4.

Figure 6:
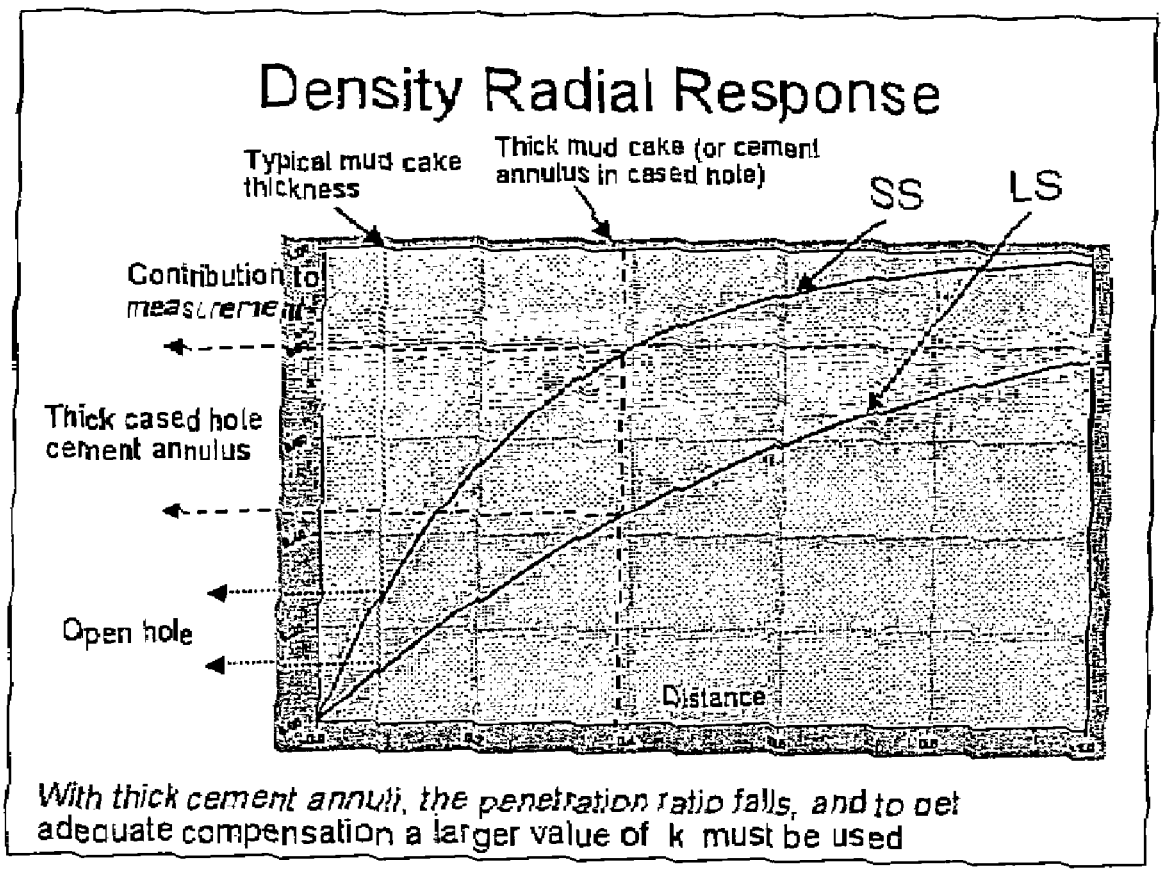
FIG. 6 is a plot that is similar to that of FIG. 3, but showing the contribution to measurement plotted against depth of penetration, in the case of a cased hole.

There is another advantage that can be gained from this technique of separating Static and Dynamic compensation factors. This is well illustrated in logging density tools through casing. In a cased well, because of the large standoff caused by the thickness of the casing and the cement, the situation is somewhat different, from the FIG. 3 response, as represented in FIG. 6.

The value of A/B here can be such that the value of k exceeds 2. Also in casing the count-rate, especially at the far-spacing detector, is suppressed.

The value of k directly multiplies the long-spaced density in the compensation equation, which in turn directly multiplies the level of non-synchronous statistical noise by the same amount. In order to recover the original level of noise by increasing the logging source activity, this activity would have to increase by a factor of $k^2$, which can be very significant.

Re-Considering the Equation:

Compensated Density=Far Density+Correction(1)+Correction(2)

Figure 7:
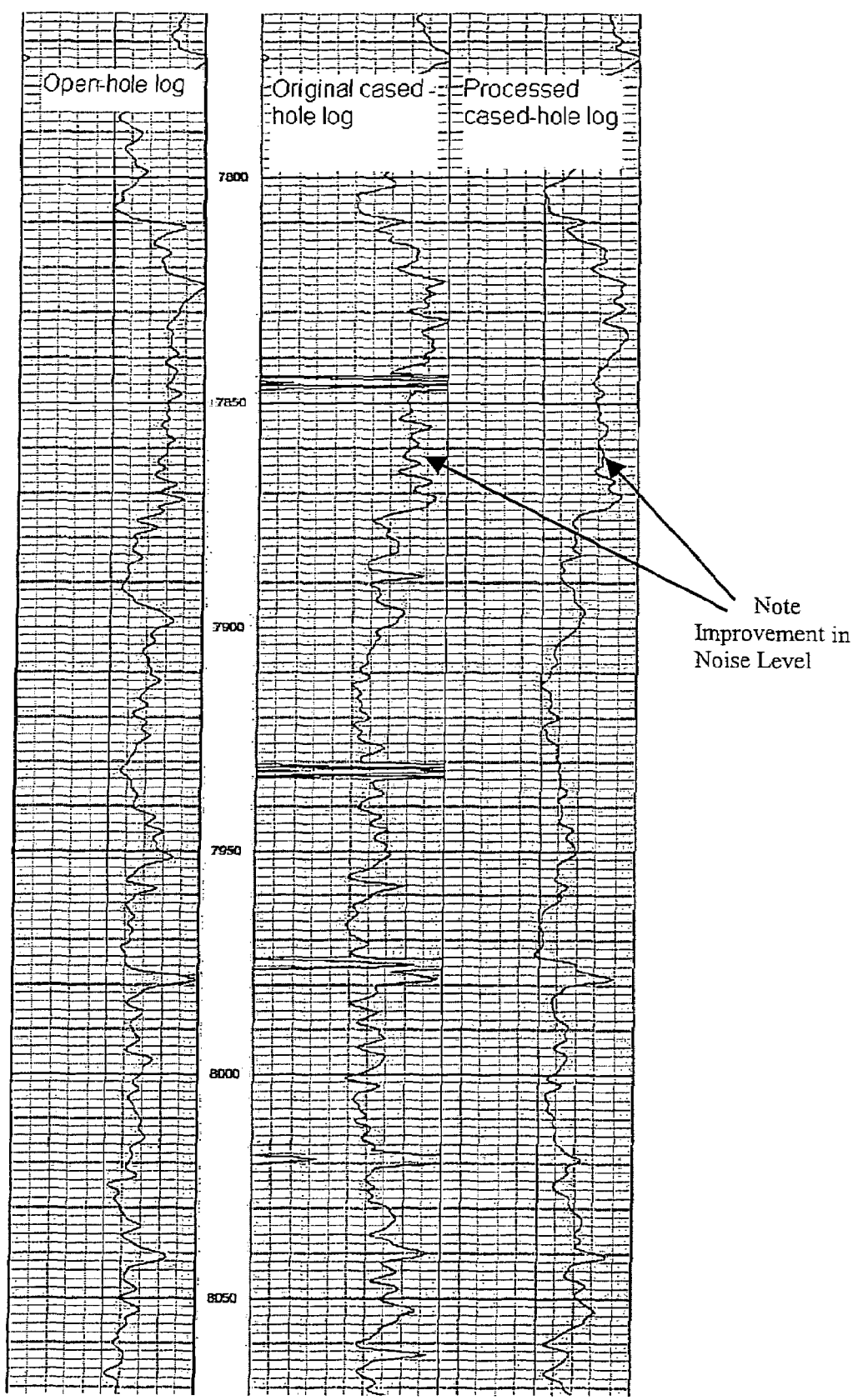
FIG. 7 is a plot comparing open-hole, original cased hole and noise-reduced cased hole logs in the same well.

In a cased well there is no rugosity, and so Correction (2) can be set to be 0. Since Correction (1) is slow-moving, it has a long filter applied to it, which reduces its random noise very substantially. The resultant Compensated Density therefore has associated with it only the noise derived from the Far Density without the multiplying factor, k. The results of this are shown in FIG. 7. In this case the final processed log also has had the large excursions caused by the casing collars removed cosmetically. The collars, which are areas of thicker casing, are detected by the observation of anomalously high densities, and their cosmetic removal executed by substituting density values derived from neighboring "non-collar" regions of the casing. The significance of FIG. 7 however is mainly the reduction of the noise on the final cased log.

The reduction in noise illustrated by FIG. 7 is not limited to cased wells, but will accrue whenever it is necessary to use a large value of "k". This situation arises whenever the tool standoff is large, and this can notably occur with Logging While Drilling (LWD) density tools. The method of the invention embraces use in such situations.

In conclusion, the method of the invention involves separating the static and dynamic parts of the log density compensation technique, processing them individually, and then adding them back to the log to result in a much improved log when there are well irregularities that the standard methods do not successfully deal with.

The invention claimed is:

1. A method for determining formation density in a region in the vicinity of a borehole wall by producing a compensated density log by logging a borehole using a density logging device, the method including irradiating the region using a source of gamma radiation and detecting using near-spaced and far-spaced radiation detectors for obtaining a density derived from near and far density values obtained from the outputs of the near-spaced and far-spaced detectors, the method comprising the steps of:
   (i) compensating the far density values using a programmable computer by adding a correction at a given point in a density log wherein:
      (a) the correction comprises a first correction function and a second correction function;
      (b) the method includes the step of relating the first correction function at a given point in the density log to the difference between the far and near density values multiplied by a first function of penetration ratio and the first correction is defined by the expression:

(k−1)*(far density−near density)

in which k is said first function of penetration ratio; and
      (c) the method includes the step of relating the second correction at a given point in the log to the difference between the far density difference and the near density difference multiplied by a second function of penetration ratio and defining the second correction by the expression:

(k'−1)*(far density difference−near density difference)

in which k' is said second function of penetration ratio, "far density difference" at a given point in the density log is the difference between the far density filtered by a long filter, and the logged far density; and "near density difference" at a given point in the density log is the difference between the near density filtered by the long filter, and the logged near density;
   wherein the value of the second correction is not zero; and
   (ii) producing the compensated density log derived from said previous steps.

2. A method according to claim 1 including the step of smoothing the far density and the near density using the long filter.

3. The method according to claim 2 further including the step of filtering the logged near density to match its vertical resolution to the far density.

4. The method according to claim 2 further including the step of depth-aligning the logged near and far densities.

5. The method according to claim 1 further including the step of depth-aligning the logged near and far densities.

6. The method according to claim 1 further including the step of programming a programmable computer to carry out said compensating.

7. The method of claim 1 wherein the first and second corrections respectively are corrections for "slow-moving" and "fast-moving" perturbations at said given point.

8. A method according to claim 1 when carried out in respect of a cased hole log.

9. A method according to claim 8 further including the step of compensating the cased hole log for the presence of casing collars.

10. The method according to claim 1 further including the step of filtering the logged near density to match its vertical resolution to the far density.

11. The method according to claim 1 wherein k is said first function of penetration ratio further comprises k is a first value of a parameter that is related to the penetration ratio by the expression k=(A/B)/((A/B)−1), in which A/B represents the penetration ratio.

12. A method for determining formation density in a region in the vicinity of a borehole wall by producing a compensated density log by logging a borehole using a density logging device, the method including irradiating the region using a source of gamma radiation and detecting using near-spaced and far-spaced radiation detectors for obtaining a density derived from near and far density values obtained from the outputs of the near-spaced and far-spaced detectors, the method comprising the steps of:

(i) compensating the far density values using a programmable computer by adding a correction at a given point in a density log wherein:
  (a) the correction comprises a correction function; and
  (b) the method includes the step of relating the correction function at a given point in the density log to the difference between the far and near density values smoothed using a long filter multiplied by a function of penetration ratio, and the correction is defined by the expression:

$(k-1)*(\text{far density} - \text{near density})$ in which k is said function of penetration ratio; and
(ii) producing the compensated density log derived from said previous steps.

* * * * *